(12) United States Patent
Ezrielev et al.

(10) Patent No.: US 12,464,000 B2
(45) Date of Patent: Nov. 4, 2025

(54) IDENTIFYING POISONED DATA DURING DATA CURATION USING FALSE POSITIVE DETECTION

(71) Applicant: Dell Products L.P., Round Rock, TX (US)

(72) Inventors: Ofir Ezrielev, Beer Sheva (IL); Hanna Yehuda, Acton, MA (US); Kristen Jeanne Walsh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 210 days.

(21) Appl. No.: 18/343,921

(22) Filed: Jun. 29, 2023

(65) Prior Publication Data

US 2025/0007933 A1   Jan. 2, 2025

(51) Int. Cl.
*H04L 9/40*     (2022.01)
*G06F 21/64*   (2013.01)

(52) U.S. Cl.
CPC .......... *H04L 63/1425* (2013.01); *G06F 21/64* (2013.01)

(58) Field of Classification Search
USPC .......................................................... 726/23
See application file for complete search history.

(56) References Cited

U.S. PATENT DOCUMENTS

| | | |
|---|---|---|
| 7,315,805 B2 | 1/2008 | Slater |
| 9,990,383 B2 | 6/2018 | Brinnand |
| 10,168,691 B2 | 1/2019 | Zornio et al. |
| 10,936,479 B2 | 3/2021 | Maag et al. |
| 11,101,037 B2 | 8/2021 | Allen |
| 11,221,270 B2 | 1/2022 | Evans |
| 11,341,605 B1 | 5/2022 | Singh |
| 11,853,853 B1 | 12/2023 | Beauchesne et al. |
| 12,008,046 B1 | 6/2024 | Curtis et al. |

(Continued)

OTHER PUBLICATIONS

Wang, Haozhe, et al., "A graph neural network-based digital twin for network slicing management," IEEE Transactions on Industrial Informatics 18.2 (2020): 1367-1376 (10 Pages).
Wang, Haozhe, et al., "A graph neural network-based digital twin for network slicing management," IEEE Transactions on Industrial Informatics 18.2 (2020): 1367-1376 (11 Pages).
Almasan, Paul, et al., "Digital Twin Network: Opportunities and challenges," arXiv preprint arXiv:2201.01144 (2022) (7 Pages).

(Continued)

*Primary Examiner* — Sakinah White Taylor
(74) *Attorney, Agent, or Firm* — WOMBLE BOND DICKINSON (US) LLP (57) ABSTRACT

Methods and systems for curating data by a data manager are disclosed. Data may be curated from various data sources before being supplied to downstream consumers, and the downstream consumers may rely on the trustworthiness of the curated data to facilitate desired computer-implemented services. Therefore, to identify data (e.g., poisoned data) that, if provided to downstream consumers may negatively impact the desired computer-implemented services, the data may undergo anomaly detection. Data anomalies indicating the presence of poisoned data may be identified based on anomaly patterns exhibited by the data. However, an anomaly pattern may be likely to appear by chance (e.g., may incorrectly indicate the presence of poisoned data) in large volumes of complex data. Therefore, anomaly detection may be coupled with false positive detection in order to manage false positive anomalies. When a true positive anomaly (e.g., poisoned data) is detected, the poisoned portion may be identified and/or remediated.

20 Claims, 5 Drawing Sheets

(56) References Cited

U.S. PATENT DOCUMENTS

| | | | |
|---|---|---|---|
| 12,216,651 B2 | 2/2025 | Krishnan | |
| 12,242,892 B1* | 3/2025 | Burnett | G06F 9/485 |
| 2004/0064750 A1 | 4/2004 | Conway | |
| 2006/0009881 A1 | 1/2006 | Ferber et al. | |
| 2013/0205285 A1* | 8/2013 | Pizlo | G06F 9/45516 717/151 |
| 2013/0227573 A1 | 8/2013 | Morsi | |
| 2014/0037161 A1 | 2/2014 | Rucker | |
| 2014/0136184 A1 | 5/2014 | Hatsek | |
| 2016/0098037 A1 | 4/2016 | Zornio | |
| 2018/0081871 A1 | 3/2018 | Williams | |
| 2019/0034430 A1 | 1/2019 | Das | |
| 2019/0236204 A1 | 8/2019 | Canim | |
| 2019/0251479 A1 | 8/2019 | Anderson et al. | |
| 2019/0370263 A1 | 12/2019 | Nucci | |
| 2020/0166558 A1 | 5/2020 | Weis | |
| 2020/0167224 A1 | 5/2020 | Abali | |
| 2020/0202478 A1 | 6/2020 | Thumpudi et al. | |
| 2020/0293684 A1 | 9/2020 | Harris | |
| 2021/0027771 A1 | 1/2021 | Hall | |
| 2021/0116505 A1 | 4/2021 | Shu | |
| 2021/0374143 A1 | 12/2021 | Neill | |
| 2021/0377286 A1 | 12/2021 | Shukla et al. | |
| 2021/0406110 A1 | 12/2021 | Vaid et al. | |
| 2022/0092234 A1 | 3/2022 | Karri | |
| 2022/0301027 A1 | 9/2022 | Basta | |
| 2022/0310276 A1 | 9/2022 | Wilkinson | |
| 2022/0374399 A1 | 11/2022 | Kementsietsidis | |
| 2023/0014438 A1 | 1/2023 | Jones | |
| 2023/0040834 A1 | 2/2023 | Haile | |
| 2023/0126260 A1 | 4/2023 | Elsakhawy et al. | |
| 2023/0153095 A1 | 5/2023 | Rahill-Marier | |
| 2023/0161596 A1 | 5/2023 | Vadapandeshwara | |
| 2023/0196096 A1* | 6/2023 | Milne | G06F 18/214 706/25 |
| 2023/0213930 A1 | 7/2023 | Rakshit | |
| 2023/0315078 A1 | 10/2023 | Sepulveda et al. | |
| 2023/0342281 A1 | 10/2023 | Haile | |
| 2023/0418280 A1 | 12/2023 | Emery | |
| 2024/0119364 A1 | 4/2024 | Jain | |
| 2024/0126888 A1 | 4/2024 | Kalou et al. | |
| 2024/0235952 A9 | 7/2024 | Hicks | |
| 2024/0281419 A1 | 8/2024 | Alfaras | |
| 2024/0281522 A1* | 8/2024 | Kuo | G06N 3/08 |
| 2024/0330136 A1 | 10/2024 | Furlong | |
| 2024/0412104 A1* | 12/2024 | Zhang | G06N 20/00 |

OTHER PUBLICATIONS

Hu, Weifei, et al., "Digital twin: A state-of-the-art review of its enabling technologies, applications and challenges," Journal of Intelligent Manufacturing and Special Equipment 2.1 (2021): 1-34 (34 Pages).

Khan, Latif U., et al., "Digital-Twin-Enabled 6G: Vision, Architectural Trends, and Future Directions," IEEE Communications Magazine 60.1 (2022): 74-80 (7 Pages).

Nguyen, Huan X., et al., "Digital Twin for 5G and Beyond," IEEE Communications Magazine 59.2 (2021): 10-15. (12 Pages).

Wang, Danshi, et al., "The Role of Digital Twin in Optical Communication: Fault Management, Hardware Configuration, and Transmission Simulation," IEEE Communications Magazine 59.1 (2021): 133-139 (6 Pages).

Pang, Toh Yen, et al., "Developing a digital twin and digital thread framework for an 'Industry 4.0' Shipyard," Applied Sciences 11.3 (2021): 1097 (22 Pages).

Isto, Pekka, et al., "5G based machine remote operation development utilizing digital twin," Open Engineering 10.1 (2020): 265-272 (8 Pages).

Redick, William, "What is Outcome-Based Selling?" Global Performance, Web Page <https://globalperformancegroup.com/what-is-outcome-based-selling/> accessed on Feb. 14, 2023 (8 Pages).

"The Best Data Curation Tools for Computer Vision in 2022," Web Page <https://www.lightly.ai/post/data-curation-tools-2022> accessed on Feb. 14, 2023 (9 Pages).

Bebee, Troy et al., "How to detect machine-learned anomalies in real-time foreign exchange data," Google Cloud, Jun. 10, 2021, Web Page <https://cloud.google.com/blog/topics/financial-services/detect-anomalies-in-real-time-forex-data-with-ml> accessed on Feb. 14, 2023 (16 Pages).

Bosch et al., "Towards Automated Detection of Data Pipeline Faults", 2020 27th Asia-Pacific Software Engineering Conference (APSEC). IEEE, pp. 346-355 (Year: 2020).

Grafberger et al., "Towards Interactively Improving ML Data Preparation Code via Shadow Pipelines", DEEM '24: Proceedings of the Eighth Workshop on Data Management for End-to-End Machine Learning, published on Jun. 9, 2024, retrieved from <https://doi.org/10.1145/3650203.3663327> on Aug. 11, 2025 (5 pages).

Chowdhury et al., "An Approach for Data Pipeline with Distributed Query Engine for Industrial Applications", published in 2020 25th IEEE International Conference on Emerging Technologies and Factory Automation (ETFA), retrieved from <https://ieeexplore.ieee.org/stamp/stamp.jsp?tp=&arnumber=9212050> on Sep. 9, 2025 (4 pages).

* cited by examiner

IDENTIFYING POISONED DATA DURING DATA CURATION USING FALSE POSITIVE DETECTION

FIELD

Embodiments disclosed herein relate generally to data management. More particularly, embodiments disclosed herein relate to systems and methods to identify poisoned data that may be introduced during data curation.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for curating data from data sources prior to addition to (e.g., being stored in) a data repository. Data curation may refer to a process of collecting, organizing, preserving, and/or maintaining data for use by consumers. For example, downstream consumers of curated data may rely on raw and/or processed (e.g., transformed, organized, etc.) data being made accessible in order to provide computer-implemented services.

Data curation may include obtaining data from various data sources and/or storing the data in one or more data repositories. The data repository may be managed by a data manager that may also manage the data curation process, which may include quality control measures. For example, quality control measures may be implemented in order to detect anomalous data collected from the data sources, such as poisoned data provided by malicious parties. To detect and/or measure the anomalousness of the collected data, statistical methods may be employed. When an anomaly is detected (e.g., by comparing a statistical characterization of a data point to a threshold), the data manager and/or the downstream consumers may be alerted of the presence of poisoned data.

However, small-scale anomaly detection (e.g., performed on individual or small groups of data points of raw data) may not detect certain types of anomalous data, such as large amounts of statistically consistent anomalous data and/or poisoned data designed to otherwise remain undetected during anomaly detection processes. Therefore, to detect these types of malicious attacks, anomaly detection may be performed on a larger scale using aggregate data.

Anomaly detection may include the identification of anomaly patterns in the data. The anomaly patterns may be used to describe the anomalousness of the data and may include patterns of statistical characterizations of the data that are outside standard and/or expected patterns.

However, when identifying anomalies in large amounts of data (e.g., complex data), the likelihood of false positives (e.g., of identified anomalies) may increase. For example, a given anomaly pattern may be more likely to appear in large amounts of complex data by chance when compared to smaller amounts of simpler data. Thus, in larger, more complex datasets, the presence of poisoned data may be incorrectly identified (e.g., via a given anomaly pattern appearing by chance in a dataset) and therefore may be classified as a false positive anomaly. Incorrectly identified anomalous data may negatively affect data curation efficiency and/or lead to a misappropriation of limited resources (e.g., computing resources spent investigating non-anomalous data).

To prevent and/or reduce the number of false positives in anomaly detection, a false positive detection process may be implemented. The false positive detection process may include the analysis of modeled data (e.g., synthetic datasets with similar characteristics to the collected data) in order to identify and/or classify incorrectly indicated anomalies as false positives. Detected anomalies that are not identified as false positives may be classified as true positive anomalies.

Thus, a true positive anomaly may indicate the presence of anomalous (e.g., untrustworthy and/or poisoned) data of data collected from data sources. However, only the poisoned portions of the collected data may pose a threat to the downstream consumers. The poisoned portions (e.g., the smallest portions of data only including poisoned data) may be identified using optimization methods (e.g., global optimization methods). Further, the poisoned data may be used to generate actions (e.g., action sets) that may be performed in order to remediate the impact of the poisoned data on the computer-implemented services provided by the downstream consumers.

By doing so, embodiments disclosed herein may provide a system for identifying poisoned data collected from various data sources during data curation. The detection and identification of anomalous data (e.g., poisoned data introduced by malicious parties) may be improved by (i) performing anomaly detection at an aggregate level to detect (statistical) anomalies in the collected data (e.g., anomalous data), (ii) detecting and/or disregarding false positive anomalies (e.g., statistical anomalies that incorrectly indicate the presence of poisoned data in the collected data), and/or (iii) identifying poisoned portions of data represented by the anomalous data using optimization methods. The collected data and/or the data source(s) that supplied the collected data may be managed by performing remedial actions that may increase the likelihood of providing the downstream consumers with uninterrupted and/or reliable access to unpoisoned (e.g., higher quality) data.

By doing so, an improved computing device and/or distributed system may be obtained. The improved device and/or system may be more likely to be able to provide the desired computer-implemented services.

In an embodiment, a method for curating data from data sources by a data manager is provided. The method may include making an identification that the data includes poisoned data. Based on the identification, the method may also include performing a false positive detection process to obtain a false positive score for the data, the false positive score being usable to validate the identification. The false positive detection process may include obtaining modeled data, the modeled data being intended to have similar data characteristics of the data.

The method may also include making a comparison between the false positive score and a score threshold to determine whether the data likely includes the poisoned data. In a first instance of the comparison where the data likely includes the poisoned data, the method may include treating the data as including the poisoned data.

Making the identification may include performing a first anomaly detection process on the data to identify an anomaly pattern, the first anomaly detection process using at least an anomaly threshold and a first degree of anomalousness of the data identified using the anomaly pattern, the data being aggregate data and the first degree of anomalousness being based on an aggregate data summary for the aggregate data.

The anomaly pattern may indicate that the first degree of anomalousness exceeds the anomaly threshold.

Obtaining the modeled data may include obtaining a plurality of synthetic datasets, the plurality of synthetic datasets being generated using at least one selected from a list consisting of an autoencoder, an inference model, and a resampling procedure for the data.

The false positive detection process may further include: performing a second anomaly detection process on the plurality of synthetic datasets to obtain degrees of anomalousness and corresponding anomaly patterns for each synthetic dataset of the plurality of synthetic datasets; obtaining a statistical distribution of the anomaly patterns; and, obtaining the false positive score for the data based on the statistical distribution and the anomaly pattern.

The false positive score may include a ratio of a number of instances of synthetic datasets of the plurality of synthetic datasets having degrees of anomalousness that exceed the anomaly threshold to a total number of the plurality of synthetic datasets.

The data characteristics may include a number of members.

Treating the data as including the poisoned data may include performing an optimization process to identify the poisoned data and initiating performance of an action set to manage an impact of the poisoned data.

A non-transitory media may include instructions that when executed by a processor cause the computer-implemented method to be performed.

A data processing system may include the non-transitory media and a processor, and may perform the computer-implemented method when the computer instructions are executed by the processor.

Figure 1:
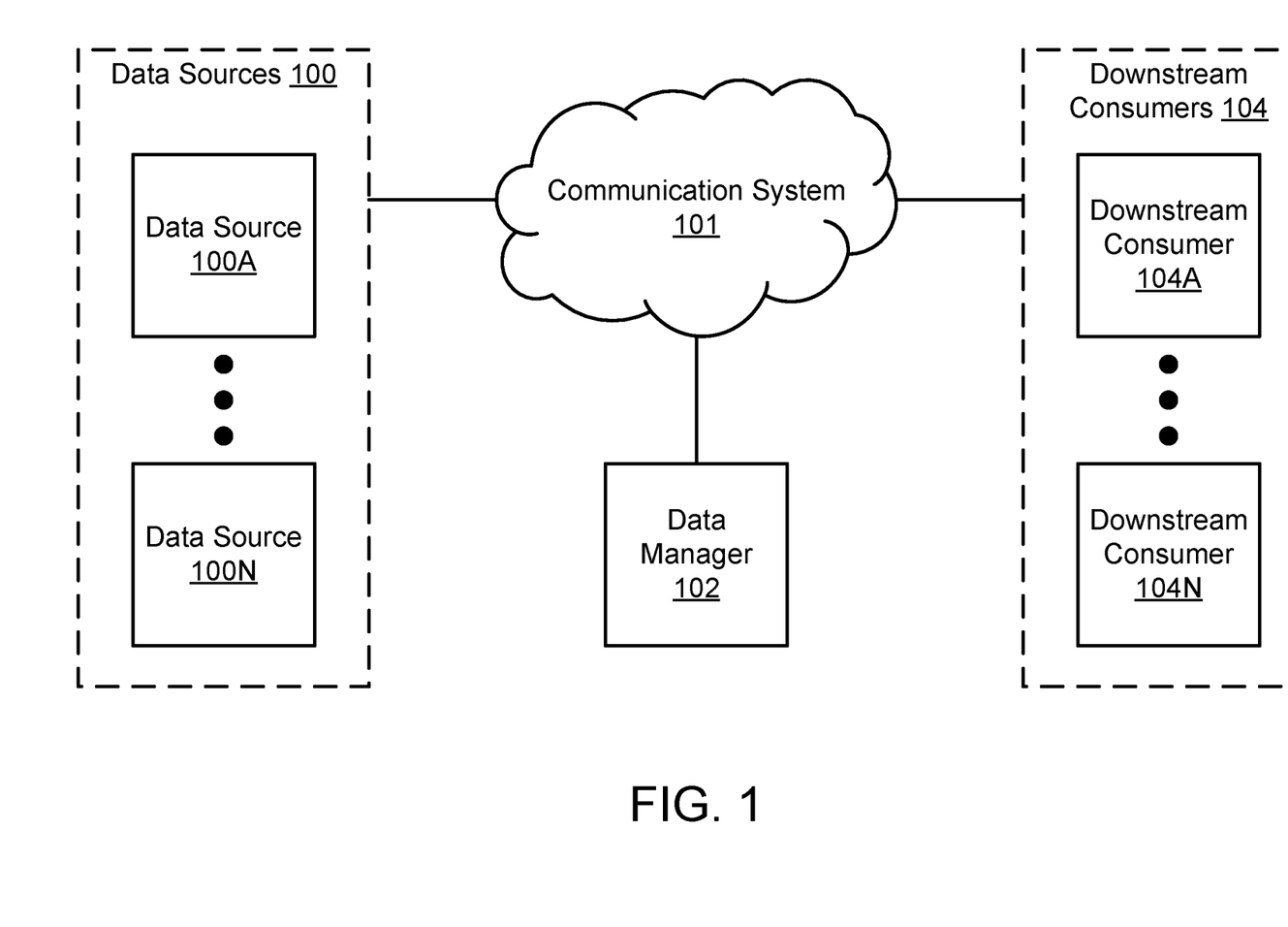
FIG. 1 shows a block diagram illustrating a system in accordance with an embodiment.

Turning to FIG. 1, a block diagram illustrating a system in accordance with an embodiment is shown. The system shown in FIG. 1 may provide computer-implemented services utilizing data obtained from any number of data sources and managed by a data manager prior to performing the computer-implemented services. The computer-implemented services may include any type and quantity of computer-implemented services. For example, the computer-implemented services may include monitoring services (e.g., of locations), communication services, and/or any other type of computer-implemented services.

The computer-implemented services may be performed, in part, by using artificial intelligence (e.g., inference) models. The inference models may, for example, be implemented with artificial neural networks, decision tress, regression analysis, and/or any other type of model usable for learning purposes. For example, data obtained from data sources may be used as training data (e.g., used to train the inference models to perform the computer-implemented services), and/or as ingest data (e.g., used as input to the trained inference models in order to perform the computer-implemented services).

To facilitate the computer-implemented services, the system may include data sources 100. Data sources 100 may include any number of data sources. For example, data sources 100 may include one data source (e.g., data source 100A) or multiple data sources (e.g., 100A-100N). Each data source of data sources 100 may include hardware and/or software components configured to obtain data, store data, provide data to other entities, and/or to perform any other task to facilitate performance of the computer-implemented services.

All, or a portion, of data sources 100 may provide (and/or participate in and/or support the) computer-implemented services to various computing devices operably connected to data sources 100. Different data sources may provide similar and/or different computer-implemented services.

For example, data sources 100 may include any number of temperature sensors positioned in an environment to collect temperature measurements according to a data collection schedule. Data sources 100 may be associated with a data pipeline and, therefore, may collect the temperature measurements, may perform processes to sort, organize, format, and/or otherwise prepare the data for future processing in the data pipeline, and/or may provide the data to other data processing systems in the data pipeline (e.g., via one or more application programming interfaces (APIs)).

The data provided by data sources 100 may include metadata such as data source characteristics (e.g., information regarding the data source). Data source characteristics may include (i) a security posture (e.g., security status) of the data source, (ii) a type of data source (e.g., database, application, etc.), (iii) a vendor and/or host of the data source host, (iv) an amount of data provided by the data source over a given time period, and/or (v) other information describing the data source (e.g., data source identifiers (IDs), configuration information, download and/or upload speeds, etc.

Data sources 100 may provide data to data manager 102. Data manager 102 may include any number of data processing systems including hardware and/or software components configured to facilitate performance of the computer-implemented services. Data manager 102 may include a database (e.g., a data lake, a data warehouse, etc.) to store data obtained from data sources 100 (and/or other entities throughout a distributed environment).

Data manager 102 may obtain data (e.g., from data sources 100), process the data (e.g., clean the data, transform the data, extract values from the data, etc.), store the data, and/or may provide the data to other entities (e.g., downstream consumer 104) as part of facilitating the computer-implemented services. Continuing with the above example, data manager 102 may obtain the temperature measurements from data sources 100 as part of the data pipeline. Data manager 102 may obtain the temperature measurements via a request through an API and/or via other methods.

Prior to data being stored by data manager 102, data may be subjected to quality control measures. The quality control measures may include the monitoring and/or analysis of the data. For example, as data is collected, anomaly detection processes may be performed in order to identify unexpected changes in the collected data. Anomaly detection may be used to identify incomplete, irrelevant, and/or inaccurate data among the collected data. Anomaly detection algorithms may employ statistical analysis and/or machine learning to identify data that deviates from a norm (e.g., what is historically expected). For more details regarding anomaly detection, refer to the discussion of FIG. 2.

Data curation (e.g., anomaly detection) may be performed by a data processing system of data manager 102 and/or a data processing system independent of data manager 102 (e.g., a third party).

Continuing with the above example, data manager 102 may curate the temperature data (e.g., identify errors/omissions and correct them, etc.) and may store the curated temperature data temporarily and/or permanently in a data lake or other storage architecture. Following curating the temperature data, data manager 102 may provide the temperature measurements to other entities for use in performing the computer-implemented services.

Data managed by data manager 102 (e.g., stored in a data repository managed by data manager 102, obtained directly from internet of things (IoT) devices managed by data manager 102, etc.) may be provided to downstream consumers 104. Downstream consumers 104 may utilize the data from data sources 100 and/or data manager 102 to provide all, or a portion of, the computer-implemented services. For example, downstream consumers 104 may provide computer-implemented services to users of downstream consumers 104 and/or other computing devices operably connected to downstream consumers 104.

Downstream consumers 104 may include any number of downstream consumers (e.g., 104A-104N). For example, downstream consumers 104 may include one downstream consumer (e.g., 104A) or multiple downstream consumers (e.g., 104A-104N) that may individually and/or cooperatively provide the computer-implemented services.

All, or a portion, of downstream consumers 104 may provide (and/or participate in and/or support the) computer-implemented services to various computing devices operably connected to downstream consumers 104. Different downstream consumers may provide similar and/or different computer-implemented services.

However, if the data utilized by downstream consumers 104 is untrustworthy (e.g., includes poisoned data), the computer-implemented services facilitated by downstream consumers 104 may be negatively affected. For example, data obtained from a malicious data source of data sources 100 may include poisoned portions of data that may be untrustworthy. The poisoned portions may be provided by malicious parties with the intent to negatively impact (and/or influence the outcome of the computer-implemented services provided by) the downstream consumers. Thus, the detection of anomalous data (e.g., poisoned data) may be implemented to ensure the provision of desired computer-implemented services.

Continuing with the above example, downstream consumers 104 may utilize the temperature data via data manager 102 as input data for climate models. Specifically, downstream consumers 104 may utilize the temperature data to simulate future temperature conditions in various environments over time (e.g., to predict weather patterns, climate change, etc.). However, the introduction of poisoned temperature data (e.g., incorrect temperature data) may skew the climate models, and/or may negatively impact the simulations, which may prevent downstream consumers 104 from providing the desired computer-implemented services.

Anomalous (e.g., poisoned) data may be identified in collected data based on an analysis of patterns (e.g., anomaly patterns) satisfied by the collected data (e.g., aggregate collected data). An anomaly pattern may indicate a relationship between a statistical characterization (e.g., a statistical measurement of one or more features of aggregate data) and a threshold. For example, if the anomaly pattern is defined as the statistical characterization exceeding the threshold and the anomaly pattern is satisfied, then the data (e.g., represented by the aggregate data) may include anomalous data.

However, the likelihood of false positives (e.g., incorrect identifications of anomalous data) may increase in certain types of data (e.g., as dataset size increases and/or as data complexity increases). In other words, it may be more likely to find an anomaly pattern in larger amounts of data than in smaller amounts of data just by chance (e.g., without an indication of anomalous data being present). The incorrect detection of anomalous (e.g., poisoned) data may negatively affect data curation (e.g., may slow data curation, may require more resources for investigation and/or management of false positive anomalies, etc.). Therefore, false positive detection methods may be implemented that further analyze the identified anomaly patterns.

In general, embodiments disclosed herein may provide methods, systems, and/or devices for curating data from data sources. The data curation methods may employ processes that may (i) perform data aggregation of data collected from data sources (e.g., to obtain aggregate data summaries), (ii) detect the presence of anomalous data (e.g., data anomalies) in the collected data (e.g., based on anomaly patterns identified through statistical analysis of the aggregate data summaries), (iii) detect and/or filter false positive anomalies from true positive anomalies (e.g., based on inferential statistical analysis of the anomaly patterns), and for true positive anomalies, (iv) identify anomalous data portions (e.g., using global optimization algorithms), (v) identify potentially malicious data sources (e.g., that supplied the anomalous data portions), and/or (vi) identify remedial actions that may be performed to manage the impact of the anomalous data portions and/or potentially malicious data sources (e.g., impacts on downstream consumers).

By doing so, the system may be more likely to be able to provide trustworthy data to downstream consumers that may facilitate performance of the desired computer-implemented services.

Figure 2:
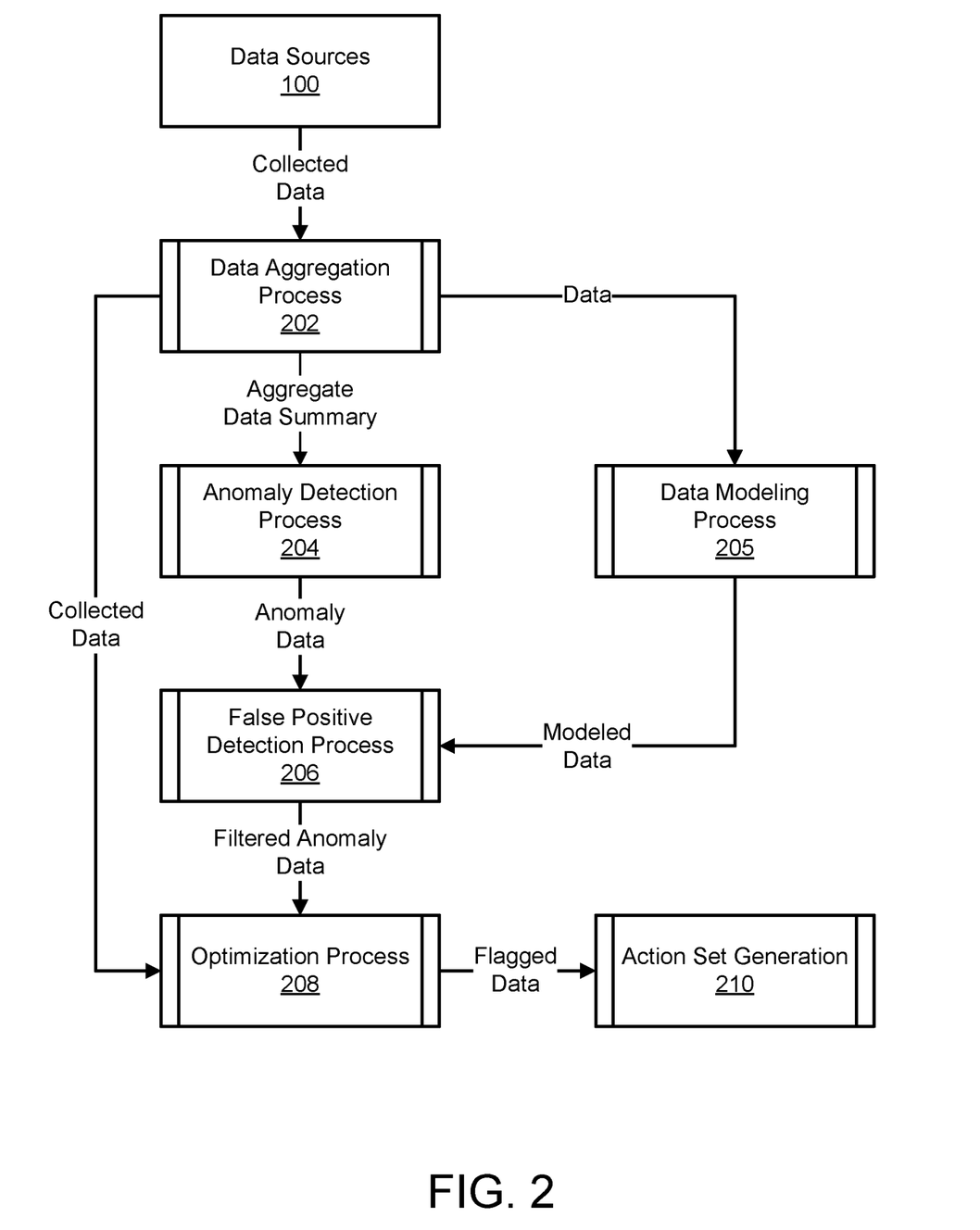
FIG. 2 shows a data flow diagram illustrating a process of identifying poisoned data with false positive detection in accordance with an embodiment.
Figure 3A:
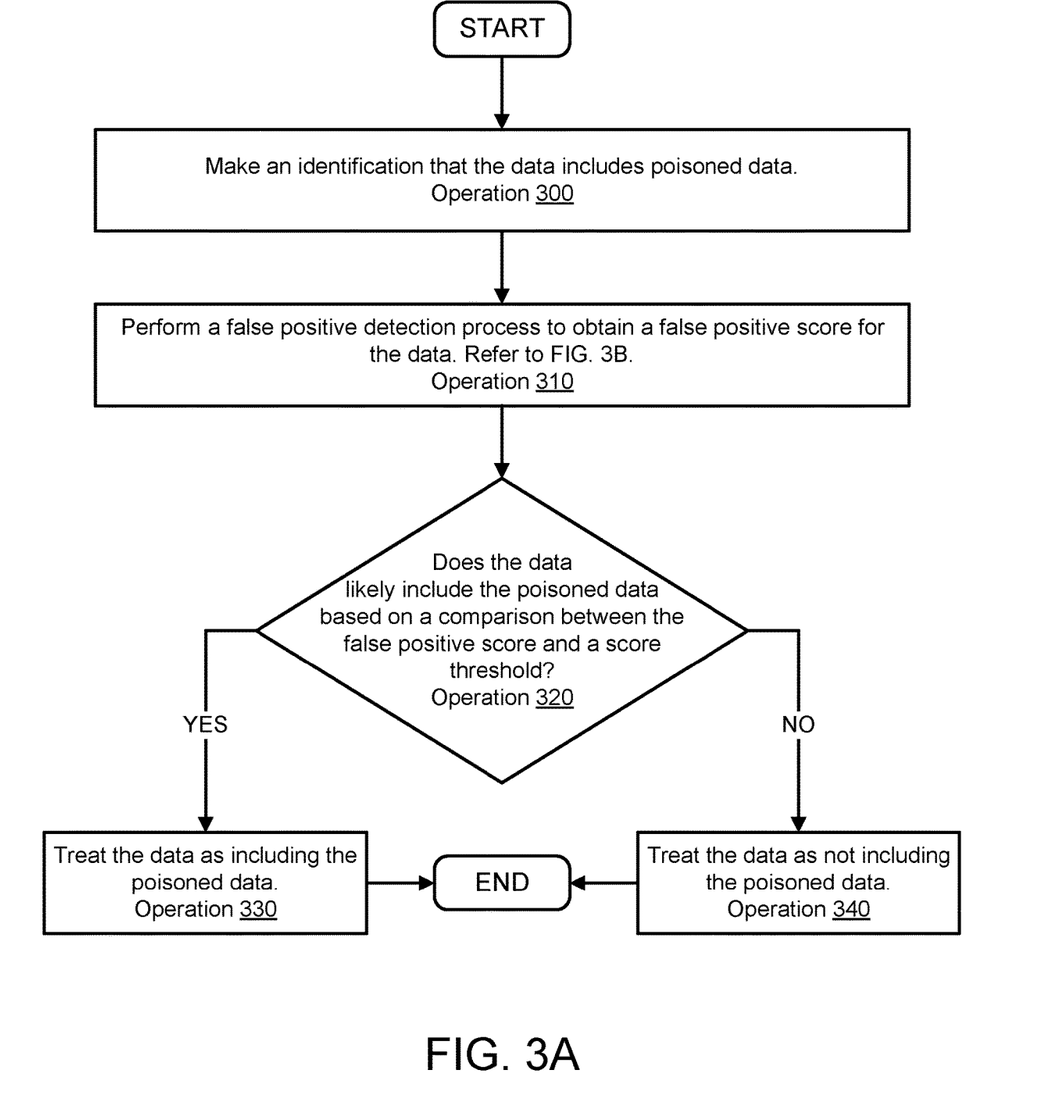
FIG. 3A shows a flow diagram illustrating a method for curating data in accordance with an embodiment.
Figure 3B:
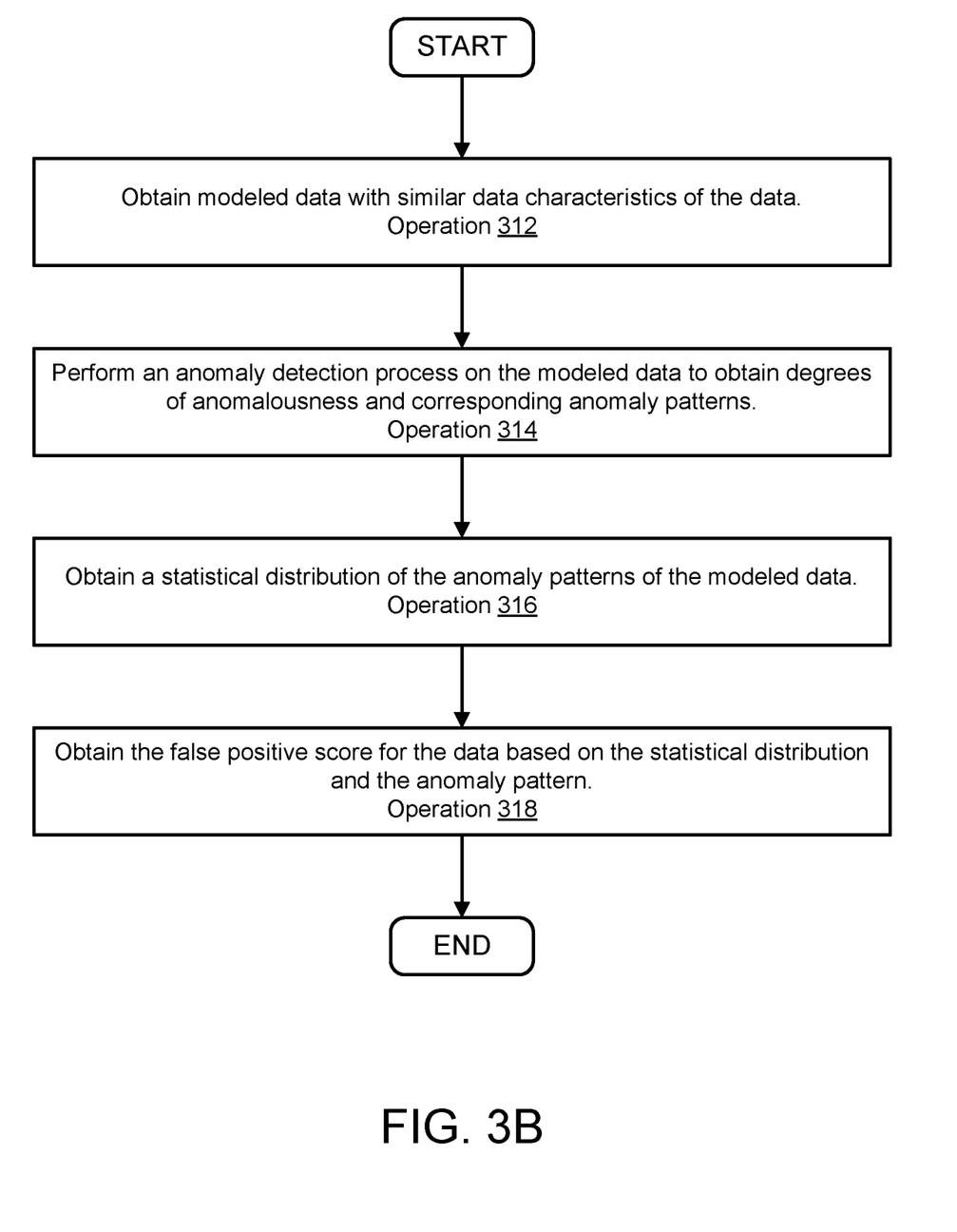
FIG. 3B shows a flow diagram illustrating a method for obtaining a false positive score in accordance with an embodiment.

When performing its functionality, data sources 100, data manager 102, and/or downstream consumers 104 may perform all, or a portion, of the methods and/or actions shown in FIGS. 2-3B.

Data sources 100, data manager 102, and/or downstream consumers 104 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

In an embodiment, one or more of data sources 100, data manager 102, and/or downstream consumers 104 are implemented using an internet of things (IoT) device, which may include a computing device. The IoT device may operate in accordance with a communication model and/or management model known to data sources 100, data manager 102, downstream consumers 104, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

While the above example relates to climate models, it will be appreciated that data may be collected and/or stored in data repositories in order to provide other types of computer-implemented services without departing from embodiments disclosed herein.

The system described in FIG. 1 may be used to identify anomalies (e.g., statistical anomalies) in collected data during data curation. The identified anomalies may be subject to false positive detection in order to classify and/or separate true positive anomalies from false positive anomalies. The true positive anomalies may indicate the presence of poisoned data in the collected data; therefore, poisoned data portions of the collected data may be identified in order to mitigate their effects. The following operations described in FIG. 2 may be performed by the system in FIG. 1 when providing this functionality.

Turning to FIG. 2, a data flow diagram is shown in accordance with an embodiment. The data flow diagram may illustrate a process of identifying poisoned data with false positive detection in a system similar to that of FIG. 1. The poisoned data may be identified using various processes, including data aggregation processes, anomaly detection processes, false positive detection processes (e.g., that may include data modeling processes), and/or optimization processes.

As discussed with respect to FIG. 1, data sources 100 may provide data (e.g., curated data) to downstream consumers 104 in order to facilitate the provision of computer-implemented services. The data curation process may collect, organize, and/or transform raw data into data usable by downstream consumers.

Raw data obtained from data sources 100 (e.g., collected data) may undergo data aggregation process 202. Data aggregation process 202 may be performed at a large scale (e.g., using large amounts of data), and may include gathering portions of the collected data and/or compiling the collected data. For example, data points of the raw data may be aggregated with respect to time (e.g., within a time interval), and/or may be summarized at different levels of granularity (e.g., the summary may include statistics describing individual data points and/or compiled statistics describing groups of data points). The summary may include a report of statistics such as minimum, maximum, mean, standard deviation, mode, sum, count, etc., the values of which may be used to gain insight into data anomalousness.

As used herein, when data is referred to being anomalous, the anomalousness may be in reference to the statistics of the data (e.g., the statistics of the aggregate data) as being anomalous with respect to the statistics of other data (e.g., other aggregate data). As such, anomalous data may be untrustworthy (e.g., poisoned, irrelevant, etc.).

Continuing with the temperature data example, the temperature measurements collected from temperature sensors may be aggregated by geographical region over a number of years. An aggregate data summary may include compiled statistics (e.g., daily minimum, daily maximum, hourly average, etc.) that describe the temperature measurements for each day of each year for the geographical region. The data (e.g., compiled statistics) presented in the aggregate data summary may be used, for example, to identify whether the collected temperature data (and/or newly collected temperature data) includes anomalous (e.g., untrustworthy) temperature measurements.

Any number of summaries (e.g., aggregate data summaries) may be generated during data aggregation process 202. Data aggregation process 202 may include storing the aggregate data summaries in a database where the summaries may be collated and/or later accessed for further statistical analysis (e.g., for the purposes of anomaly detection).

Anomaly detection process 204 may include obtaining an aggregate data summary generated by data aggregation process 202. Anomaly detection process 204 may be performed using statistical analysis, for example, by generating statistical characterizations (e.g., statistical measurements) of the aggregate data (e.g., using information from an aggregate data summary of the aggregate data). The statistical characterization may indicate the degree of anomalousness of the aggregate data.

To determine whether the aggregate data described by the statistical characterization includes anomalous data, an anomaly pattern may be identified (not shown) based on a statistical analysis of the data (e.g., aggregate data) using the aggregate data summary. The anomaly pattern may define a relationship between the statistical characterization and an anomaly threshold. For example, the anomaly pattern may be defined as a statistical characterization (e.g., z-score, ratio, and/or other forms of statistical measurement) of the data exceeding the anomaly threshold. In other words, if the anomaly pattern is satisfied (e.g., the degree of anomalousness of the aggregate data exceeds the anomaly threshold), then an identification may be made that the data (e.g., represented by the aggregate data) includes poisoned data.

Anomaly detection process 204 may also be performed using an inference model trained to perform anomaly detection on aggregate data. For example, the inference model may be trained using historical aggregate data that has been labeled (e.g., by a user) based on historical outcomes of data poisoning. The trained inference model may then identify anomaly patterns and/or generate predictions for (e.g., likelihoods of) whether newly generated aggregate data includes anomalous data based on the identified anomaly patterns (e.g., whether newly collected data represented by the newly generated aggregate data includes poisoned data).

When anomalous data is detected during anomaly detection process 204, anomaly data may be provided to and/or accessed by false positive detection process 206. Anomaly data may include (i) a notification (e.g., that an anomaly was detected), (ii) data pointers (e.g., that point to the addresses of the collected data summarized in the aggregate data summary), (iii) information regarding the anomaly pattern such as a statistical characterization (e.g., a type and/or a value indicating the degree of anomalousness of the anomaly), and/or an anomaly threshold value, (iv) characteristics of the data source(s) that supplied the collected data (e.g., data source IDs), and/or (v) other information regarding the detected anomaly.

False positive detection process 206 may use the anomaly data to identify false positives associated with the detected anomaly (e.g., false positive anomalies) from anomaly detection process 204 (e.g., detected anomalies that incorrectly indicate the presence of anomalous data). To identify false positives anomalies, false positive detection process 206 may perform statistical analysis (e.g., inferential statistical analysis) on modeled data generated by data modeling process 205.

To generate modeled data, data modeling process 205 may obtain data, (e.g., an observed dataset which may include collected data, aggregate data, and/or an aggregate data summary) from data aggregation process 202. Data modeling process 205 may generate one or more synthetic datasets with similar characteristics to the observed dataset obtained from data aggregation process 202. Similar characteristics may include the number of members of the observed dataset (e.g., dataset size), data features, etc. The modeled data (e.g., the one or more synthetic datasets) may be generated using data resampling methods (e.g., bootstrap, randomization, jackknife, etc.) and/or sampling from trained inference models (e.g., autoencoders, autoregressive models, etc.).

For example, a large number of synthetic datasets may be generated using resampling with replacement, where data samples (e.g., members) of the observed dataset are randomly sampled from the observed dataset enough times to generate a synthetic dataset of the same size as the observed dataset. The process may be repeated to generate the large number of synthetic datasets.

Synthetic datasets may be generated using trained inference models (e.g., generative models). For example, an autoencoder trained (e.g., using the observed dataset and/or historically collected data similar to the observed dataset) to reconstruct the observed dataset may be sampled to generate new data (e.g., synthetic datasets) with similar characteristics to the observed dataset. Other types of generative models may be used to generate modeled data (e.g., a large number of synthetic datasets) that has similar statistical characteristics to and/or similar patterns (e.g., anomaly patterns) satisfied by the observed dataset.

Any number of synthetic datasets (e.g., resampled data) may be generated by data modeling process 205. The synthetic datasets may be generated by a remote data processing system (e.g., operated by a third party) and/or may be obtained by data modeling process 205. The generated synthetic datasets may be analyzed as part of false positive detection process 206 in order to validate the identification of the data including poisoned data made as a result of anomaly detection process 204.

False positive detection process 206 may include obtaining modeled data (e.g., synthetic datasets) following data modeling process 205. The synthetic datasets may be used to obtain a statistical distribution (e.g., of anomaly patterns and/or degrees of anomalousness of the synthetic datasets) based on the observed dataset. To do so, false positive detection process 206 may perform anomaly detection on each of the synthetic datasets to obtain degrees of anomalousness and corresponding anomaly patterns for each of the synthetic datasets. The distribution of anomaly patterns of the synthetic datasets may be analyzed to determine the statistical significance (e.g., false positive score) of the anomaly pattern being present in the observed dataset.

False positive detection process 206 may include obtaining a false positive score (not shown) based on the anomaly pattern distribution (e.g., of synthetic datasets). The false positive score may indicate a probability and/or likelihood estimate that the anomaly pattern is satisfied by the data randomly (e.g., by chance), which may indicate the likelihood of the observed dataset including anomalous (e.g., poisoned) data. Thus, the false positive score may be an indicator of a likelihood that the detected anomaly is a false positive (e.g., higher false positive scores may indicate a higher likelihood of the identification being a false positive).

The false positive score may include a probability value (e.g., a p-value, relating to hypothesis testing), an expectation value (e.g., an e-value, relating to bioinformatics), and/or any other measure that represents the probability of the anomaly pattern being present in (e.g., satisfied by) each of the synthetic datasets. For example, the false positive score may be a ratio of the number of synthetic datasets in which the anomaly pattern was present to the total number of generated (e.g., analyzed) synthetic datasets. In this example, if the false positive score is smaller than a given level of significance, then the anomaly pattern identified in the observed dataset may be statistically significant, which may indicate that the detected anomaly is a true positive anomaly.

To determine whether a detected anomaly is a false positive, false positive detection process 206 may include making a comparison between the false positive score and a score threshold (e.g., a significance level). Based on the comparison (e.g., magnitudes of values), the detected anomaly may be classified as either a true positive anomaly or a false positive anomaly. For example, if the false positive score is smaller than the score threshold, the false positive score may indicate that there is a low likelihood of the anomaly pattern appearing by chance in the collected data; therefore, the anomaly may be classified as a true positive anomaly (e.g., indicating that the collected data likely includes poisoned data).

False positive detection process 206 may provide filtered anomaly data (e.g., for the true positive anomaly) to optimization process 208. Filtered anomaly data may include (i) anomaly data (e.g., relating to the true positive anomaly as described above) and/or (ii) information regarding the classification of the true positive anomaly (e.g., the false positive score and/or the score threshold). Filtered anomaly information may be used by optimization process 208 to identify the poisoned portion of the collected data.

Optimization process 208 may include identifying a poisoned portion of data associated with an anomaly detected during anomaly detection process 204 (e.g., an anomaly classified as a true positive anomaly by false positive detection process 206). Optimization process 208 may minimize (or maximize) an objective function, and the objective function may be used to constrain and/or quantify possible solutions of optimization process 208. Optimization process 208 may be implemented using an optimization algorithm such as a genetic algorithm and/or other global optimization algorithms that may be used to solve optimization problems for complex datasets and/or multivariate objective functions.

To identify the poisoned portion of data, optimization process 208 may obtain anomaly data from false positive detection process 206 (e.g., information regarding the detected anomaly associated with the aggregate data summary) and/or a dataset from data aggregation process 202 (e.g., the collected data associated with the aggregate data summary). The optimization algorithm may generate (e.g., iteratively) sets of test proposals, where each test proposal indicates a different delineation of the dataset. The delineations may define two portions of the dataset: a first portion being potentially poisoned, and a second portion being potentially unpoisoned. The first iteration of test proposals may be randomly generated (e.g., based on a random sampling of the data). Subsequent iterations of test proposals may be generated based on a selection of test proposals from the previous iteration, and iterations may continue until a satisfactory solution (e.g., the optimized solution) is determined, and/or a maximum number of iterations is reached.

Each test proposal of a given iteration may be evaluated (e.g., assigned a fitness value) based on data characteristics of one or each of the portions. The data characteristics may include a statistical characterization of the potentially unpoisoned portion (e.g., that describes the anomalousness of the potentially unpoisoned portion), and/or the size of the poisoned portion. For example, the statistical characterization of the potentially unpoisoned portion may be compared to an anomaly threshold (e.g., the same anomaly threshold used as part of anomaly detection process 204). If the statistical characterization is inferior to the anomaly threshold, the test proposal may be further evaluated using an objective function.

The objective function may be generated and/or obtained by optimization process 208. The objective function may be based on optimization criteria such as (i) a size of a portion of the data (e.g., a potentially poisoned portion), (ii) a degree of anomalousness of a portion of the data (e.g., a potentially unpoisoned portion associated with the potentially poisoned portion), (iii) data source characteristics (e.g., a number of data sources that provided the potentially poisoned data, data source security postures, etc.), and/or (iv) any other criterion useful for evaluating the data portions and/or data sources (e.g., anomaly thresholds, data source hosts, etc.).

Different objective functions may be generated using different selections of optimization criteria. The objective function, when minimized (or maximized, depending on the selected optimization criteria), may be used to find an optimal solution for the identification of poisoned data. The objective function may be used to determine the fitness value (e.g., of a test proposal).

The fitness value may be based on the residual of the objective function (e.g., the objective function may be a loss function). The fitness value may be used to determine which test proposals best satisfy the loss function. For example, test proposals that are assigned smaller fitness values may better satisfy the loss function than those being assigned larger fitness values.

Returning to the evaluation of test proposals, each test proposal of a given iteration may be ranked by their respective fitness value (e.g., in ascending order). One or more ranked test proposals may be selected for use in the subsequent iteration (e.g., to generate another set of test proposals). The selected test proposal(s) may be one or more of the highest-ranked test proposals (e.g., the test proposals that provide the most satisfactory solution to the global optimization problem for the given iteration).

The selected test proposals may undergo modifications before being used to generate the subsequent iteration of test proposals. For example, some elements of a selected test proposals may be adjusted (e.g., mutation), and/or other selected test proposals may be combined (e.g., crossover). However, in some cases, one or more selected test proposals may be used to generate the subsequent iteration without change (e.g., elitism).

Once a maximum number of iterations and/or a predetermined fitness value threshold is reached, optimization process 208 may identify a final test proposal. The final test proposal may indicate a delineation between the least anomalous potentially unpoisoned portion and the smallest potentially poisoned portion most likely to include all of the poisoned data. In other words, the final test proposal may determine the most likely poisoned portion of the data.

As discussed with respect to FIG. 1, the impact of supplying poisoned data to downstream consumers may adversely affect the intended computer-implemented services. Therefore, the poisoned portion of data may be flagged as poisoned data. The flagged data may include metadata such as (i) data pointer information, (ii) an anomaly pattern (e.g., a statistical characterization that may indicate the degree of anomalousness of the data and/or an anomaly threshold), (iii) a likelihood of the data being anomalous (e.g., a false positive score for the data and/or a score threshold, (iv) characteristics of the data source(s) that provided the anomalous data, and/or (v) other metadata describing attributes of the flagged data.

To manage the impact of the identified poisoned data, action set generation 210 may generate an action set based on the flagged data from optimization process 208. For example, the action set may include (i) separating the poisoned portion of the data from the remainder of the data (e.g., the unpoisoned portion of the data), (ii) retaining (e.g., curating) the unpoisoned portion and/or making the unpoisoned portion available to downstream consumers, (iii) preventing storage of the poisoned portion of data in the data repository, (iv) screening the portion of poisoned data from use by a downstream consumer, (v) identifying and/or flagging a potentially malicious data source (e.g., that provided at least a portion of the poisoned data), (vi) terminating and/or pausing data collection from a potentially malicious data source, and/or (vii) performing other action to reduce impacts of the flagged data and/or data source.

Thus, as illustrated in FIG. 2, the system of FIG. 1 may perform (i) data aggregation, (ii) anomaly detection, (iii) data modeling, and/or (iv) false positive detection (e.g., of detected anomalies). For true positive anomalies, the system of FIG. 1 may also identify poisoned data (e.g., based on anomaly detection performed on the aggregate data and/or identify potentially malicious data sources. When poisoned data is identified an action set may be generated in order to (i) mitigate and/or prevent impacts to downstream consumers that may otherwise consume the poisoned data, and/or (ii) manage potentially malicious data sources to prevent future impacts of obtaining poisoned data from the potentially malicious data sources.

As discussed above, the components of FIG. 1 may perform methods for data curation from data sources that may supply poisoned data. The methods may include identifying data anomalies (e.g., filtering out false positive anomalies), and/or managing the introduction of anomalous (e.g., poisoned) data into the data pipeline by implementing remedial actions. FIGS. 3A-3B illustrate methods that may be performed by the components of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of curating data from data sources in accordance with an embodiment is shown. The method may be performed by a data processing system, and/or another device.

At operation 300, an identification that the data includes poisoned data may be made. The identification may be made by performing an anomaly detection process using a degree of anomalousness of the data and an anomaly threshold. The anomaly detection process may include (i) obtaining aggregate data (e.g., to obtain an aggregate data summary) based on the data, (ii) obtaining a statistical characterization (e.g., a degree of anomalousness) based on the aggregate data summary. (iii) identifying an anomaly pattern (e.g., identifying an anomaly threshold based on a statistical analysis of the aggregate data summary), (iii) evaluating the degree of anomalousness based on the anomaly pattern (e.g., by comparing the degree of anomalousness to the anomaly threshold). The evaluation of the degree of anomalousness may indicate whether the data includes poisoned data. For example, if a degree of anomalousness of a portion of data exceeds the anomaly threshold, the portion of data may include poisoned data.

The aggregate data may be obtained by (i) reading the aggregate data from storage, (ii) receiving the aggregate data from another device (e.g., a third party and/or remote device), and/or (iii) generating the aggregate data. The aggregate data may be generated, for example, by performing a data aggregation process similar to that described with respect to FIG. 2.

The statistical characterization (e.g., degree of anomalousness) may be obtained by (i) reading the statistical characterization from storage, (ii) receiving the statistical characterization from another device (e.g., a third party and/or remote device), and/or (iii) generating the statistical characterization. The statistical characterization may be generated, for example, by generating statistical measurements one or more features of the aggregate data (e.g., mean, mode, standard deviation, etc.)

The anomaly pattern may be identified, for example, by performing a statistical analysis of the aggregate data summary. The statistical analysis may include the analysis of a statistical distribution of one or more features of the aggregate data in order to identify statistical outliers and/or corresponding anomaly thresholds (e.g., threshold values that delineate statistically anomalous values).

For example, the anomaly pattern may indicate that a statistical characterization (e.g., degree of anomalousness) of the data that exceeds the anomaly threshold is anomalous (e.g., degree of anomalousness is high enough to indicate the data may include poisoned data). In this example, the anomaly pattern may be satisfied (e.g., indicate the presence of poisoned data in the data) if the degree of anomalousness of the data exceeds the anomaly threshold.

Anomaly detection may be performed by an independent entity (e.g., a third party), thus, aggregate data summaries and/or statistical characterizations (e.g., degrees of anomalousness) may be provided to the independent entity for further analysis and/or anomaly detection. When anomalous data is detected, a notification (e.g., including information regarding the anomaly) may be obtained from the independent entity. For more information regarding data aggregation and anomaly detection, refer to the discussion of FIG. 2.

At operation 310, based on the identification made at operation 300, a false positive detection process may be performed to obtain a false positive score for the data. The false positive detection process may be performed by analyzing the anomalousness of modeled data in order to obtain a false positive score for the data. The false positive detection process may be performed via the methods illustrated in FIG. 3B. Once the false positive score is obtained, the false positive score may be used to validate the identification of poisoned data made in operation 300.

At operation 320, a determination is made regarding whether the data likely includes the poisoned data. The determination may be based on a comparison between the false positive score and a score threshold. For example, if the false positive score is equal to or exceeds the score threshold, then the data likely includes the poisoned data. Conversely, if the false positive score is inferior to the score threshold, then the data does not likely include the poisoned data. The score threshold may be determined (e.g., predetermined) by a user and/or may be based on relationships between historical identifications of data poisoning and false positive scores.

If it is determined that the comparison indicates that the data likely includes the poisoned data, the method may proceed to operation 330 following operation 320. Otherwise, the method may proceed to operation 340 following operation 320.

At operation 330, the data may be treated as including the poisoned data. The data may be treated by (i) performing an optimization process to identify the poisoned data, (ii) generating an action set (e.g., based on the poisoned data), and/or (iii) initiating performance of an action set to manage an impact of the poisoned data.

The optimization process may be performed by ingesting the data into an optimization algorithm. The optimization process may be a global optimization process, and the optimization algorithm (e.g., global optimization algorithm) may be a genetic algorithm and/or may attempt to solve an optimization problem (e.g., identify the smallest portion of data that includes all of the poisoned data) constrained by variables of a fitness analysis function. For example, the fitness analysis function may include a loss function and therefore, to identify the poisoned data, the optimization algorithm may attempt to find solutions to the optimization problem that minimize the residual of the objective function.

The optimization algorithm may generate iterations of candidate solutions (e.g., sets of test proposals) that indicate different delineations between potentially poisoned data and potentially unpoisoned data. Each subsequent iteration of candidate solutions may be generated based on the best candidates (e.g., test proposals) from the previous iteration.

Each test proposal of the set of test proposals (e.g., generated by each iteration) may be evaluated based on (i) a degree of anomalousness of each of the different portions of the data (e.g., defined by the delineations of each test proposal), (ii) a size of each of the different portions, and/or (iii) values describing data source characteristics of data sources providing each of the different portions (e.g., security posture scores, a number of data sources, etc.).

The size of each portion may be determined by counting the number of elements within each portion. The degree of anomalousness of each portion may be based on a statistical characterization of each portion of the data (e.g., of an aggregate data summary of each portion of the data). The degree of anomalousness may be determined by comparing the statistical characterization to one or more anomaly thresholds (e.g., including the anomaly threshold used for anomaly detection in operation 300).

A security posture score for a data source may be determined by evaluating degrees of anomalousness of current data, historical data, and/or the frequency of poisoned data detections from portions of historical data obtained from the data source. For example, an increase in the degree of anomalousness of current data from a given data source may indicate a higher likelihood that the current data is poisoned; whereas a data source that consistently supplies poor-quality data may maintain a consistent degree of data anomalousness.

The number of data sources supplying a portion of data may be determined by identifying each data source that contributed data to the portion (e.g., identifying a unique list of data source IDs from metadata), and enumerating each of the contributing data sources.

The test proposals may be evaluated using an objective function and/or may be assigned fitness values accordingly. For example, the objective function may penalize each test proposal (e.g., the fitness value of each test proposal) proportionally to a ratio of the size of the poisoned portion to the size of the unpoisoned portion. In other words, a test proposal indicating a smaller poisoned portion of data and a less anomalous unpoisoned portion may be assigned a more satisfactory fitness value when compared other test proposals having larger poisoned portions and more anomalous unpoisoned portions. The objective function may weight its constraint variables (e.g., anomalousness and/or size) differently depending on anomaly detection goals.

Once evaluated, each test proposal may be ranked (e.g., ordered by rank) based on its assigned fitness value. For example, the most satisfactory fitness value (e.g., smallest) may be the highest-ranked test proposal. One or more highest-ranked test proposals may be selected to generate the subsequent iteration of test proposals; however, if the global optimization process has terminated (e.g., a maximum number of iterations and/or a predetermined fitness value threshold has been reached), a final test proposal may be selected as the optimized solution of the global optimization process.

For example, the final test proposal may be the highest-ranked test proposal of the last iteration of the optimization algorithm. The final test proposal of the global optimization process may indicate a delineation between an identified poisoned portion of the data and the remainder of the data (e.g., the unpoisoned portion).

Once identified, the poisoned portion of data may be flagged in order to manage the impact of the poisoned portion of data. The flagged data may be used to generate an action set that may be implemented to mitigate the effects of the poisoned data on consumers of the data (e.g., downstream consumers). Refer to the discussion of FIG. 2 for more details regarding the identification and/or remediation of poisoned data.

Performance of the action set may be initiated by obtaining the action set. The action set may be obtained by (i) reading the action set from storage, (ii) receiving the action set from another device, and/or (iii) generating the action set (e.g., based on the identified poisoned data). Performance of the action set may be initiated by transmitting at least a portion of the action set and/or instructions regarding implementing the action set to another entity. One or more actions from the action set may be performed, and performance of the action(s) may be based on information regarding the poisoned data (e.g., flagged data).

Information regarding the poisoned data may include (i) a likelihood that the data is poisoned (e.g., based on a degree of anomalousness of the data and/or the false positive score for the data), (ii) a severity of a risk associated with the data, (iii) information regarding a data source from which the poisoned data was obtained (e.g., a data source ID), and/or (iv) other information usable to manage the poisoned data, a malicious data source, and/or their impacts. The action(s), when performed, may reduce and/or prevent an impact (e.g., a negative impact to computer-implemented services) of the identified poisoned data.

The method may end following operation 330.

Returning to operation 320, the method may proceed to operation 340 following operation 320 when it is determined that the comparison indicates that the data likely does not include the poisoned data.

At operation 340, the data may be treated as not including the poisoned data. The data may be treated by (i) proceeding to use the data as part of the data curation process (e.g. treating the data as not including an anomalous portion), (ii) flagging the data as anomalous and unpoisoned (e.g., treating the data as including an anomalous portion not provided by a malicious data source), and/or (iii) updating methods and/or parameters of anomaly detection to reflect information regarding the false positive anomaly. For example, updating statistical characterizations and/or anomaly thresholds used as part of anomaly detection (e.g., to avoid false positive anomaly detections in the future).

The method may end following operation 340.

Turning to FIG. 3B, a flow diagram illustrating a method for obtaining a false positive score in accordance with an embodiment is shown. Operations 312-318 of FIG. 3B may be an expansion of operation 310 shown in FIG. 3A.

At operation 312, modeled data with similar data characteristics of the data may be obtained. The modeled data may be obtained by (i) reading the modeled data from storage, (ii) receiving the modeled data from another device (e.g., a third party and/or remote device), and/or (iii) generating the modeled data. For example, the modeled data may include a plurality of synthetic datasets and/or may be generated by performing a resampling procedure for the data. The resampling procedure may be performed using various methods for data resampling (e.g., bootstrap method, jackknife method, etc.) using the data (e.g., the observed dataset).

The modeled data may also be generated, for example, by sampling from an inference model (e.g., a generative model trained using the observed dataset). For example, an autoencoder may be trained using the observed dataset and/or other data (e.g., an historical dataset having similar characteristics of the observed dataset). The trained autoencoder may then be sampled repeatedly to generate new data (e.g., a plurality of synthetic datasets) with similar characteristics of the observed dataset.

The modeled data (e.g., the plurality of synthetic datasets) may have similar data characteristics of the data. For example, each of the synthetic datasets may be a similar and/or same size as the data being modeled (e.g., the observed dataset).

At operation 314, an anomaly detection process may be performed on the modeled data to obtain degrees of anomalousness and corresponding anomaly patterns. The anomaly detection process may be performed by performing statistical analysis on each of the synthetic datasets to generate and/or obtain statistical characterizations of the synthetic datasets (e.g., degrees of anomalousness for each synthetic dataset of the modeled data). The anomaly detection may be performed by evaluating the synthetic datasets using the same anomaly pattern identified in operation 300 (e.g., by comparing each of the degrees of anomalousness to the anomaly threshold).

For example, each synthetic dataset may be analyzed using the anomaly pattern to determine a number of synthetic datasets that satisfy the anomaly pattern (e.g., to determine a number of synthetic datasets that indicate the presence of poisoned data based on the anomaly pattern).

At operation 316, a statistical distribution of the anomaly patterns of the modeled data is obtained. The statistical distribution may be obtained by (i) reading the statistical distribution from storage, (ii) receiving the statistical distribution from another device (e.g., a third party and/or remote device), and/or (iii) generating the statistical distribution.

The statistical distribution may be generated by (i) collecting, sorting and/or aggregating the statistical characterizations (e.g., degrees of anomalousness) and/or the anomaly patterns of the synthetic datasets, and/or (ii) estimating the statistical distribution and/or distribution parameters (e.g., based on the statistical characterizations and/or anomaly patterns). For example, the statistical distribution (e.g., probability distribution) may be a normal distribution. The estimated distribution may be further analyzed to determine probabilities and/or likelihoods relating to the modeled data.

At operation 318, the false positive score for the data may be obtained. The false positive score may be obtained by (i) reading the false positive score from storage, (ii) receiving the false positive score from another device (e.g., a third party and/or remote device), and/or (iii) generating the false positive score (e.g., by analyzing the statistical distribution).

The false positive score may be generated by obtaining values derived from confidence intervals, likelihood ratios, p-values, e-values, and/or other statistical measures that quantify the statistical analysis of the estimated probability distribution. For example, to generate the false positive score, the number of synthetic datasets that satisfy the anomaly pattern may be enumerated, and the total number of synthetic datasets may be enumerated. The false positive score may include a ratio of the number of synthetic datasets that satisfy the anomaly pattern to the number of total synthetic datasets analyzed.

The false positive score may reflect a measurement of the likelihood of the anomaly pattern appearing in the observed data randomly (e.g., without indicating the presence of anomalous and/or poisoned data), thus, the false positive score may be usable to validate the identification that the data includes poisoned data (e.g., made in operation 300). For example, if the false positive score is inferior to a score threshold, then the false positive score may indicate that the identification is valid (e.g., that the data likely includes poisoned data). Similarly, if the false positive score is equal to or exceeds the score threshold, then the false positive score may indicate that the identification is invalid (e.g., that the data likely does not include poisoned data).

The method shown in FIG. 3B may end following operation 318.

Using the method illustrated in FIGS. 3A-3B, a system in accordance with embodiments disclosed herein may be placed in condition to (i) identify poisoned data collected from data sources during data curation (e.g., by performing anomaly detection on aggregate data), (ii) identify false positive results of the anomaly detection process to prevent the false identification of poisoned data, (iii) prevent and/or mitigate the impact of the poisoned portions of the curated data by generating and/or implementing remedial action sets, and/or (iv) reduce the likelihood of poisoned data being provided to downstream consumers (e.g., through proactive identification), thereby avoiding interruptions and/or reductions in the quality of the computer-implemented services that may rely on the curated data.

Figure 4:
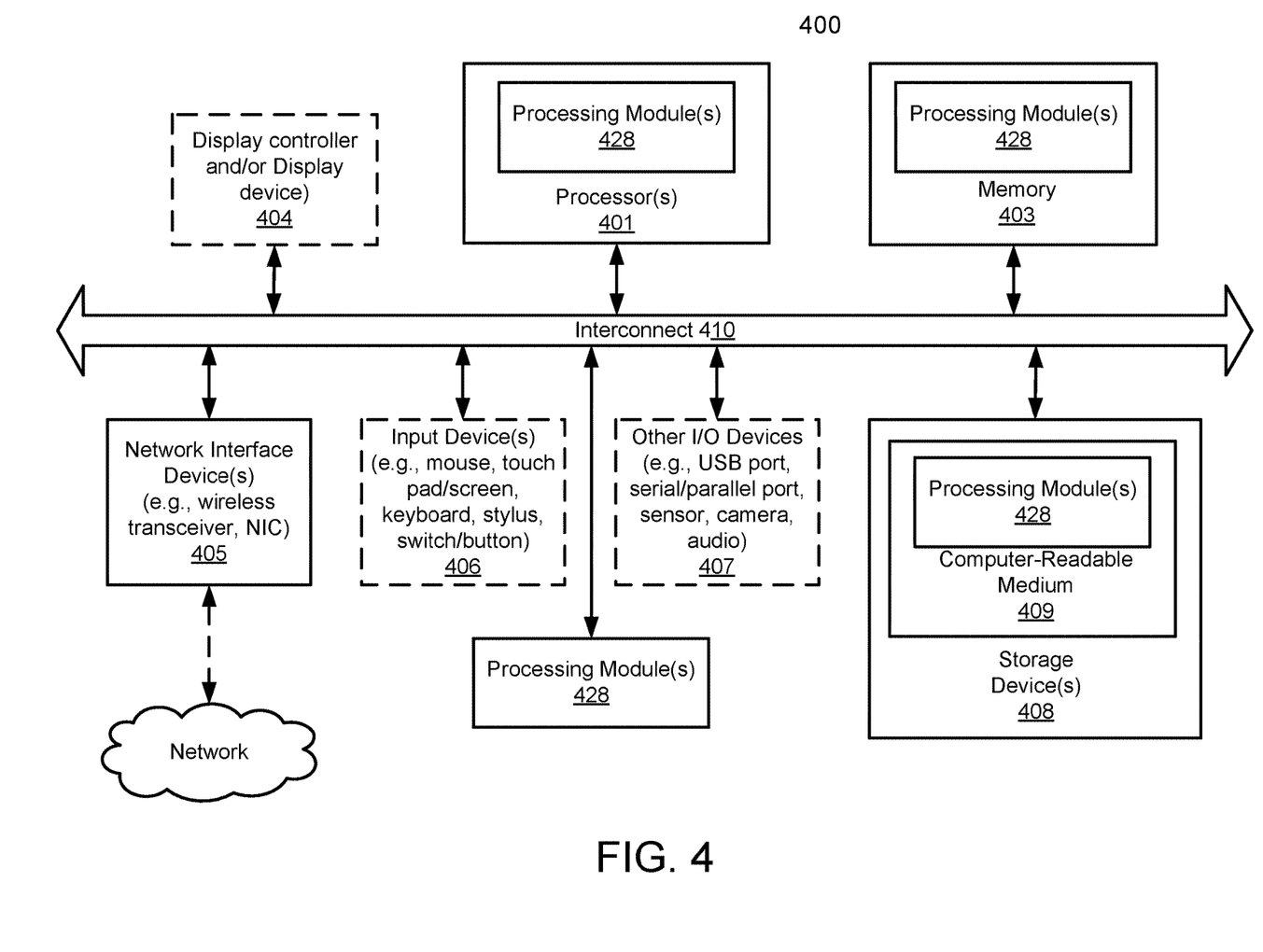
FIG. 4 shows a block diagram illustrating a data processing system in accordance with an embodiment.

Any of the components illustrated and/or described with respect to FIGS. 1-3B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such, details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for curating data from data sources by a data manager, comprising:
    making an identification that the data comprises poisoned data; and
    based on the identification:
        performing a false positive detection process to obtain a false positive score for the data, the false positive detection process comprising:
            obtaining modeled data that has similar data characteristics as the data,
            and the false positive score is usable to validate the identification,
            making a comparison between the false positive score and a score threshold to determine whether the data actually comprises the poisoned data, wherein a result of the comparison indicates whether the identification is a false positive identification or a true positive identification; and
        in a first instance of the comparison where the result indicates that the identification is a true positive identification such that the data could actually comprises the poisoned data: treating the data as actually comprising the poisoned data.

2. The method of claim 1, wherein making the identification comprises performing a first anomaly detection process on the data to identify an anomaly pattern, the first anomaly detection process using at least:
    an anomaly threshold; and
    a first degree of anomalousness of the data identified using the anomaly pattern, wherein the data is aggregate data and the first degree of anomalousness is based on an aggregate data summary for the aggregate data.

3. The method of claim 2, wherein the anomaly pattern indicates that the first degree of anomalousness exceeds the anomaly threshold.

4. The method of claim 3, wherein obtaining the modeled data comprises obtaining a plurality of synthetic datasets that are generated using at least one selected from a list consisting of:
    an autoencoder;
    an inference model; and
    a resampling procedure for the data.

5. The method of claim 4, wherein the false positive detection process further comprises:
    performing a second anomaly detection process on the plurality of synthetic datasets to obtain degrees of anomalousness and corresponding anomaly patterns for each synthetic dataset of the plurality of synthetic datasets;
    obtaining a statistical distribution of the anomaly patterns; and
    obtaining the false positive score for the data based on the statistical distribution and the anomaly pattern.

6. The method of claim 5, wherein the false positive score comprises a ratio of a number of instances of synthetic datasets of the plurality of synthetic datasets having degrees of anomalousness that exceed the anomaly threshold to a total number of the plurality of synthetic datasets.

7. The method of claim 6, wherein the data characteristics comprises a number of members.

8. The method of claim 7, wherein treating the data as actually comprising the poisoned data comprises:
    performing an optimization process to identify a poisoned portion of the data and a unpoisoned portion of the data; and initiating performance of an action set to manage an impact of the poisoned portion of the data.

9. A non-transitory machine-readable medium having instructions stored therein, which when executed by a processor, cause the processor to perform operations for curating data from data sources by a data manager, the operations comprising:
   making an identification that the data comprises poisoned data; and
   based on the identification:
      performing a false positive detection process to obtain a false positive score for the data, the false positive detection process comprising:
         obtaining modeled data that has similar data characteristics as the data, and the false positive score is usable to validate the identification;
      making a comparison between the false positive score and a score threshold to determine whether the data actually comprises the poisoned data,
         wherein a result of the comparison indicates whether the identification is a false positive identification or a true positive identification; and
      in a first instance of the comparison where the result indicates that the identification is a true positive identification such that the data actually comprises the poisoned data: treating the data as actually comprising the poisoned data.

10. The non-transitory machine-readable medium of claim 9, wherein making the identification comprises performing a first anomaly detection process on the data to identify an anomaly pattern, the first anomaly detection process using at least:
   an anomaly threshold; and
   a first degree of anomalousness of the data identified using the anomaly pattern, wherein the data is aggregate data and the first degree of anomalousness is based on an aggregate data summary for the aggregate data.

11. The non-transitory machine-readable medium of claim 10, wherein the anomaly pattern indicates that the first degree of anomalousness exceeds the anomaly threshold.

12. The non-transitory machine-readable medium of claim 11, wherein obtaining the modeled data comprises obtaining a plurality of synthetic datasets that are generated using at least one selected from a list consisting of
   an autoencoder;
   an inference model; and
   a resampling procedure for the data.

13. The non-transitory machine-readable medium of claim 12, wherein the false positive detection process further comprises:
   performing a second anomaly detection process on the plurality of synthetic datasets to obtain degrees of anomalousness and corresponding anomaly patterns for each synthetic dataset of the plurality of synthetic datasets;
   obtaining a statistical distribution of the anomaly patterns; and
   obtaining the false positive score for the data based on the statistical distribution and the anomaly pattern.

14. The non-transitory machine-readable medium of claim 13, wherein the false positive score comprises a ratio of a number of instances of synthetic datasets of the plurality of synthetic datasets having degrees of anomalousness that exceed the anomaly threshold to a total number of the plurality of synthetic datasets.

15. A data processing system, comprising:
   a processor; and
   a memory coupled to the processor to store instructions, which when executed by the processor, cause the processor to perform operations for curating data from data sources by a data manager, the operations comprising:
      making an identification that the data comprises poisoned data, and based on the identification:
         performing a false positive detection process to obtain a false positive score for the data, the false positive detection process comprising: obtaining modeled data
            that has similar data characteristics as the data, and
            the false positive score is usable to validate the identification;
      making a comparison between the false positive score and a score threshold to determine whether the data actually comprises the poisoned data, wherein a result of the comparison indicates whether the identification is a false positive identification or a true positive identification; and
      in a first instance of the comparison where the result indicates that the identification is a true positive identification such that the data could actually comprises the poisoned data: treating the data as actually comprising the poisoned data.

16. The data processing system of claim 15, wherein making the identification comprises performing a first anomaly detection process on the data to identify an anomaly pattern, the first anomaly detection process using at least:
   an anomaly threshold; and
   a first degree of anomalousness of the data identified using the anomaly pattern, wherein the data is aggregate data and the first degree of anomalousness is based on an aggregate data summary for the aggregate data.

17. The data processing system of claim 16, wherein the anomaly pattern indicates that the first degree of anomalousness exceeds the anomaly threshold.

18. The data processing system of claim 17, wherein obtaining the modeled data comprises obtaining a plurality of synthetic datasets that are generated using at least one selected from a list consisting of:
   an autoencoder;
   an inference model; and
   a resampling procedure for the data.

19. The data processing system of claim 18, wherein the false positive detection process further comprises:
   performing a second anomaly detection process on the plurality of synthetic datasets to obtain degrees of anomalousness and corresponding anomaly patterns for each synthetic dataset of the plurality of synthetic datasets;
   obtaining a statistical distribution of the anomaly patterns; and
   obtaining the false positive score for the data based on the statistical distribution and the anomaly pattern.

20. The data processing system of claim 19, wherein the false positive score comprises a ratio of a number of instances of synthetic datasets of the plurality of synthetic datasets having degrees of anomalousness that exceed the anomaly threshold to a total number of the plurality of synthetic datasets.

* * * * *